United States Patent
Fang et al.

(10) Patent No.: US 10,864,817 B2
(45) Date of Patent: Dec. 15, 2020

(54) ONBOARD REFUELING VAPOR RECOVERY SYSTEM AND AUTOMOBILE HAVING SAME

(71) Applicants: Zhejiang Geely Automobile Research Institute Co., Ltd., Linhai (CN); Zhejiang Geely Holding Group Co., Ltd., Hangzhou (CN)

(72) Inventors: Yongxin Fang, Linhai (CN); Changluo Li, Linhai (CN); Shibin Xie, Linhai (CN)

(73) Assignees: ZHEJIANG GEELY AUTOMOBILE RESEARCH INSTITUTE CO., LTD., Linhai (CN); ZHEJIANG GEELY HOLDING GROUP CO., LTD., Hangzhou (CN)

( * ) Notice: Subject to any disclaimer, the term of this patent is extended or adjusted under 35 U.S.C. 154(b) by 456 days.

(21) Appl. No.: 15/751,874

(22) PCT Filed: Jun. 7, 2016

(86) PCT No.: PCT/CN2016/085067
§ 371 (c)(1),
(2) Date: Feb. 11, 2018

(87) PCT Pub. No.: WO2017/028608
PCT Pub. Date: Feb. 23, 2017

(65) Prior Publication Data
US 2018/0236868 A1 Aug. 23, 2018

(30) Foreign Application Priority Data
Aug. 20, 2015 (CN) .......................... 2015 1 0511761

(51) Int. Cl.
*F02M 25/08* (2006.01)
*B60K 15/077* (2006.01)
(Continued)

(52) U.S. Cl.
CPC ...... *B60K 15/03504* (2013.01); *B60K 15/035* (2013.01); *B60K 15/04* (2013.01);
(Continued)

(58) Field of Classification Search
CPC ...................... B60K 15/035; B60K 15/03504; B60K 15/04; B60K 15/03519; B60K 2015/048;
(Continued)

(56) References Cited

U.S. PATENT DOCUMENTS 5,632,252 A 5/1997 Hyodo et al.
5,806,500 A 9/1998 Fargo et al.
(Continued)

FOREIGN PATENT DOCUMENTS

CN 1573073 A 2/2005
CN 101440757 A 5/2009
(Continued)

*Primary Examiner* — Phutthiwat Wongwian
*Assistant Examiner* — Arnold Castro
(74) *Attorney, Agent, or Firm* — Cheng-Ju Chiang

(57) ABSTRACT

An onboard refueling vapor recovery (ORVR) system includes a main canister, a spare canister, a hydrocarbon sensor, a grade rollover valve (GRV), a fill limit vent valve (FLVV) and a fuel vapor pipe. The GRV and the FLVV are disposed at top portion of the fuel tank, with sides of the GRV and the FLVV hermetically connected with the fuel tank and a gas inlet end of the fuel vapor pipe. The main canister and the spare canister hermetically connect with a gas outlet end of the fuel vapor pipe. The main canister communicates with an intake manifold. The hydrocarbon sensor is disposed in the main canister and electrically connected with a vehicle control unit. The hydrocarbon sensor detects hydrocarbon concentration in the main canister and transmits the detection result to the vehicle control unit. The present invention also provides an automobile having the ORVR system.

18 Claims, 2 Drawing Sheets

(51) Int. Cl.
  *F02D 41/22* (2006.01)
  *B60K 15/035* (2006.01)
  *B60K 15/04* (2006.01)

(52) U.S. Cl.
  CPC .......... *F02M 25/08* (2013.01); *F02M 25/089* (2013.01); *F02M 25/0836* (2013.01); *F02M 25/0854* (2013.01); *F02M 25/0872* (2013.01); *B60K 15/03519* (2013.01); *B60K 2015/03514* (2013.01); *B60K 2015/048* (2013.01); *F02M 2025/0845* (2013.01); *F02M 2025/0881* (2013.01)

(58) Field of Classification Search
  CPC ......... B60K 2015/03514; F02M 25/08; F02M 25/089; F02M 25/0836; F02M 25/0854; F02M 25/0872; F02M 2025/0845; F02M 2025/0881
  USPC .................................. 123/519, 520
  See application file for complete search history.

(56) References Cited

U.S. PATENT DOCUMENTS

| | | | |
|---|---|---|---|
| 6,412,277 | B2 | 7/2002 | Hagen et al. |
| 7,762,241 | B2 | 7/2010 | Childress et al. |
| 7,913,672 | B2* | 3/2011 | Elwart ............ F01N 5/02 123/519 |
| 10,677,200 | B2* | 6/2020 | Andrzejewski ...... F02M 25/089 |
| 2008/0283127 | A1* | 11/2008 | Wang ............... B60K 15/03519 137/313 |
| 2009/0288645 | A1* | 11/2009 | Childress ............ F02M 25/089 123/520 |
| 2013/0032127 | A1* | 2/2013 | Jentz .................. F02M 25/0809 123/520 |
| 2013/0118457 | A1* | 5/2013 | Chung .................. H01L 35/30 123/520 |
| 2014/0026867 | A1* | 1/2014 | Itoh .................... F02M 25/0809 123/520 |
| 2015/0096355 | A1 | 4/2015 | Makino et al. |
| 2016/0025019 | A1* | 1/2016 | Pearce ............... F02M 25/0836 123/520 |

FOREIGN PATENT DOCUMENTS

| | | |
|---|---|---|
| CN | 201272236 Y | 7/2009 |
| CN | 201934213 U | 8/2011 |
| CN | 102392761 A | 3/2012 |
| CN | 203892074 U | 10/2014 |
| CN | 105134422 A | 12/2015 |
| JP | S61-283756 A | 12/1986 |
| JP | H1-125552 A | 5/1989 |
| JP | H4-330358 A | 11/1992 |
| JP | 2001-193581 A | 7/2001 |
| JP | 2004-60485 A | 2/2004 |
| JP | 2010-221886 A | 10/2010 |

* cited by examiner

ONBOARD REFUELING VAPOR RECOVERY SYSTEM AND AUTOMOBILE HAVING SAME

CROSS REFERENCE TO RELATED APPLICATIONS

The present application is a 35 U.S.C. § 371 National Phase conversion of International (PCT) Patent Application No. PCT/CN2016/085067, filed on Jun. 7, 2016, which claims priority of Chinese Patent Application No. 201510511761.8, filed on Aug. 20, 2015, applied by ZHEJIANG GEELY AUTOMOBILE RES INST CO LTD and GEELY HOLDING GROUP CO LTD, and entitled "ONBOARD REFUELING VAPOR RECOVERY SYSTEM AND AUTOMOBILE HAVING SAME". The entire disclosure of the above-identified application is incorporated herein by reference in its entirety. The PCT International Patent Application was filed and published in Chinese.

The present application claims priority of Chinese Patent Application No. 201510511761.8, filed on Aug. 20, 2015, applied by ZHEJIANG GEELY AUTOMOBILE RES INST CO LTD and GEELY HOLDING GROUP CO LTD, and entitled "ONBOARD REFUELING VAPOR RECOVERY SYSTEM AND AUTOMOBILE HAVING SAME". The entire disclosure of the above-identified application is incorporated herein by reference in its entirety.

TECHNICAL FIELD

The present invention relates to automobile techniques, and more particularly to an onboard refueling vapor recovery system and automobile having same.

BACKGROUND

Onboard refueling vapor recovery system (ORVR) is a kind of automobile emission control system which is capable of collecting fuel vapor evaporated from the fuel tank during refueling. The ORVR system is disposed between the fuel tank and the engine of the automobile. When the automobile is refueled, the fuel vapor in the fuel tank could be adsorbed by a carbon canister with adsorption capabilities, this process is called as adsorption process. When the engine starts to operate, the fuel vapor in the carbon canister is drawn into the intake manifold of the engine and is used as fuel, this process is called as desorption process.

However, the desorption capability of the carbon canister will decline or even disabled after a long-term use. The aging of the carbon canister of the ORVR system will lead the increase of ventilation resistance of the fuel tank during the refueling process, and further result in poor refueling, jumping gun during refueling, or even could not refuel, or cause fuel leakage, and other issues.

SUMMARY

Accordingly, the present invention provides an onboard refueling vapor recovery system, which could normally refuel even when the carbon canister is aged and its desorption capability is failed.

The present invention provides an onboard refueling vapor recovery system. The onboard refueling vapor recovery system includes a main canister and a spare canister which are filled with activated carbon, a hydrocarbon sensor, a grade rollover valve, a fill limit vent valve, and a fuel vapor pipe. The grade rollover valve and the fill limit vent valve are disposed at a top portion of the fuel tank, with opposite sides of the grade rollover valve and the fill limit vent valve respectively and hermetically connected with the fuel tank and a gas inlet end of the fuel vapor pipe. The main canister and the spare canister are respectively and hermetically connected with a gas outlet end of the fuel vapor pipe. The main canister is communicated with an intake manifold of an engine. The hydrocarbon sensor is disposed in the main canister. The hydrocarbon sensor is electrically connected with a vehicle control unit. The hydrocarbon sensor detects the concentration of hydrocarbon in the main canister, and transmits the detection result to the vehicle control unit.

Furthermore, the fuel vapor pipe includes a first gas inlet, a second gas inlet, a first gas outlet, and a second gas outlet. The first gas inlet is hermetically connected with one side of the grade rollover valve, and the second gas inlet is hermetically connected with one side of the fill limit vent valve. The first gas outlet is communicated with the main canister, and the second gas outlet is communicated with the spare canister.

Furthermore, the main canister has a main canister gas inlet, and the main canister gas inlet is hermetically connected with the first gas outlet. A portion of the main canister which is away from the main canister gas inlet has a desorption gas inlet. The desorption gas inlet is connected with the intake manifold so that the main canister is communicated with the intake manifold.

Furthermore, the spare canister has a spare canister gas inlet. The spare canister gas inlet is hermetically connected with the second gas outlet.

Furthermore, the onboard refueling vapor recovery system includes a solenoid valve controller. The solenoid valve controller includes a solenoid valve. The solenoid valve is disposed between the spare canister and the second gas outlet. The spare canister communicates with the fuel vapor pipe when the solenoid valve is opened. The communication between the spare canister and the fuel vapor pipe is disconnected when the solenoid valve is closed.

Furthermore, the solenoid valve controller further includes a solenoid valve switch. The solenoid valve switch is electrically connected with the solenoid valve. The solenoid valve switch is switched on and switched off to control the opening and closing of the solenoid valve. The solenoid valve switch is electrically connected with the vehicle control unit. The vehicle control unit controls the switch on and the switch off of the solenoid valve switch to control the opening and closing of the solenoid valve.

Furthermore, the solenoid valve controller further includes a cap status sensor. The cap status sensor is disposed at a refueling port of a vehicle body. The cap status sensor is electrically connected to the vehicle control unit. The vehicle control unit receives signals sending from the cap status sensor to control the switch on and the switch off of the solenoid valve switch so as to control the opening and closing of the solenoid valve.

Furthermore, the onboard refueling vapor recovery system further includes a one-way valve. The one-way valve is disposed between the main canister and the spare canister and a communication between the main canister and the spare canister is controlled by opening and closing the one-way valve.

Furthermore, the main canister has a main canister vent, and the spare canister has a spare canister vent.

The present invention further provides an automobile which includes the forgoing onboard refueling vapor recovery system.

As described above, the technical solutions in the embodiments of the present invention have the following advantages: the onboard refueling vapor recovery system could normally refuel, adsorb and desorb the oil vapor even if the main canister is aged and its desorption capability is failed.

DETAILED DESCRIPTION OF PREFERRED EMBODIMENTS

In order to illustrate the purposes, the techniques and the advantages of the present invention more clearly, the embodiments of the present invention will be described thoroughly in conjunction with the accompanying drawings.

Figure 1:
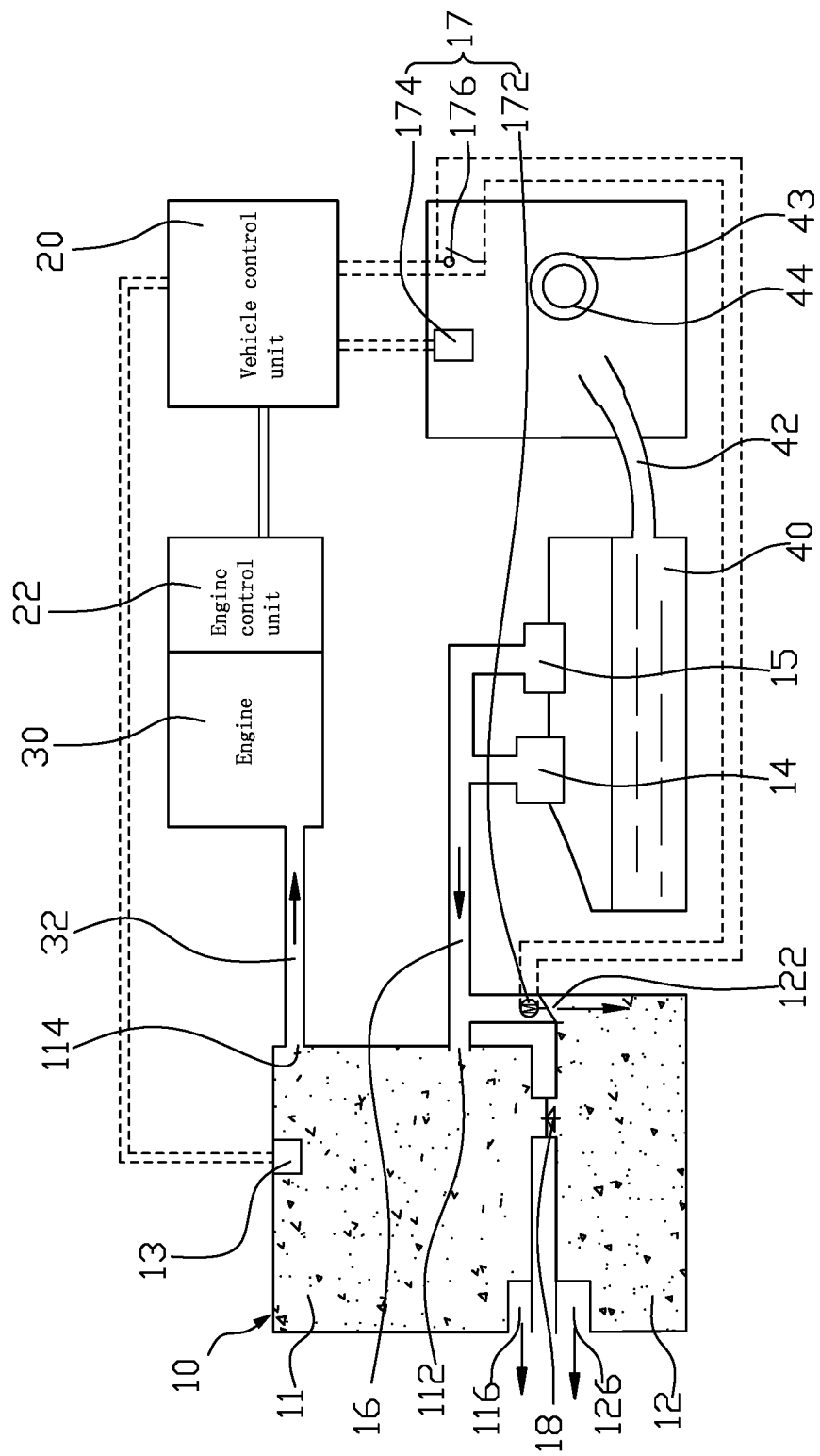
FIG. 1 is a schematic, structural view showing an onboard refueling vapor recovery system according to an embodiment of the present invention.
Figure 2:
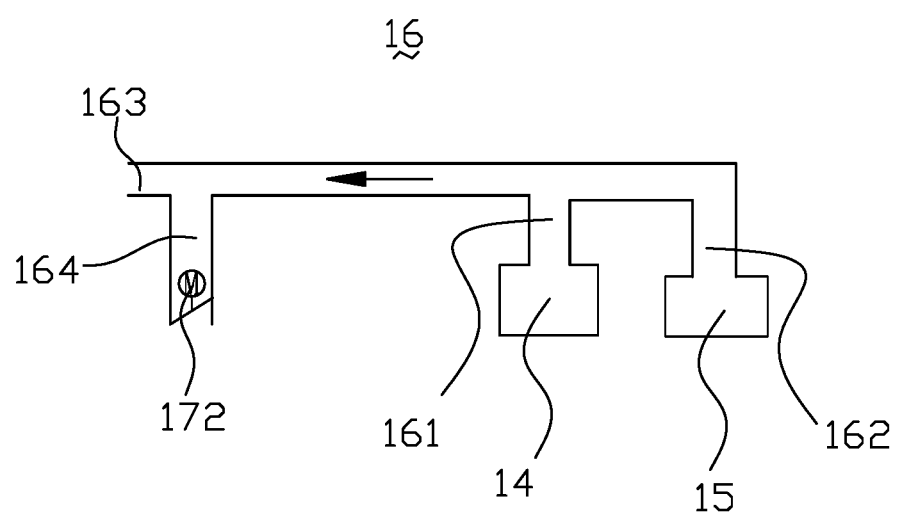
FIG. 2 is a schematic, enlarged view showing a fuel vapor pipe of FIG. 1.

FIG. 1 is a schematic, structural view showing an onboard refueling vapor recovery system according to an embodiment of the present invention. FIG. 2 is a schematic, enlarged view showing a fuel vapor pipe of FIG. 1. In order for the convenience of description, except for the onboard refueling vapor recovery system 10, FIG. 1 also shows a vehicle control unit (VCU) 20, an engine control unit 22, an engine 30, an intake manifold 32, a fuel tank 40, a refueling pipe 42, a refueling port 43, a refueling cap 44 and the like. Specifically, referring to FIG. 1 and FIG. 2, the onboard refueling vapor recovery system 10 according to an embodiment of the present invention includes a main canister 11, a spare canister 12, a hydrocarbon sensor 13, a grade rollover valve (GRV) 14, a fill limit vent valve (FLVV) 15, a fuel vapor pipe 16, a solenoid valve controller 17, and a one-way valve 18. The onboard refueling vapor recovery system 10 may be provided in a general automobile or a hybrid electric vehicle. In the present embodiment, the onboard refueling vapor recovery system 10 provided in a hybrid electric vehicle is taken as an example for description.

The grade rollover valve 14 is disposed at a top portion of the fuel tank 40. The grade rollover valve 14 is disposed between the fuel tank 40 and the fuel vapor pipe 16, with two opposite sides of the grade rollover valve 14 respectively and hermetically connected with the fuel tank 40 and a gas inlet end of the fuel vapor pipe 16, so that the grade rollover valve 14 could control the communication between the fuel tank 40 and the fuel vapor pipe 16. In the desorption process of the carbon canister, the grade rollover valve 14 is opened, and the fuel tank 40 and the fuel vapor pipe 16 communicate with each other.

Likewise, the fill limit vent valve 15 is provided at the top portion of the fuel tank 40, and the fill limit vent valve 15 and the grade rollover valve 14 are isolated from each other. The fill limit vent valve 15 is disposed between the fuel tank 40 and the fuel vapor pipe 16, with two opposite sides of the fill limit vent valve 15 respectively and hermetically connected with the fuel tank 40 and the gas inlet end of the fuel vapor pipe 16, so that the fill limit vent valve 15 could control the communication between the fuel tank 40 and the fuel vapor pipe 16. That is, in the adsorption process, the fill limit vent valve 15 is opened, and the fuel tank 40 and the fuel vapor pipe 16 communicate with each other. The grade rollover valve 14 and the fill limit vent valve 15 communicate with each other via the fuel vapor pipe 16.

The fuel vapor pipe 16 is disposed between the fuel tank 40, the main canister 11 and the spare canister 12. The fuel vapor pipe 16 includes a first gas inlet 161, a second gas inlet 162, a first gas outlet 163, and a second gas outlet 164. The first gas inlet 161 and the second gas inlet 162 are located at the gas inlet end of the fuel vapor pipe 16, while the first gas outlet 163 and the second gas outlet 164 are located at a gas outlet end of the fuel vapor pipe 16. The first gas inlet 161 is hermetically connected with one side of the grade rollover valve 14, and the second gas inlet 162 is hermetically connected with one side of the fill limit vent valve 15. The first gas outlet 163 is communicated with the main canister 11, and the second gas outlet 164 is communicated with the spare canister 12.

The main canister 11 has a hollow can body, and the main canister 11 is filled with activated carbon. The main canister 11 has a main canister gas inlet 112, and the main canister gas inlet 112 is hermetically connected with the first gas outlet 163 of the fuel vapor pipe 16. A portion of the main canister 11 which is away from the main canister gas inlet 112 has a desorption gas inlet 114. A portion of the main canister 11 which is away from the main canister gas inlet 112 and the desorption gas inlet 114 has a main canister vent 116. The desorption gas inlet 114 is connected with the intake manifold 32, and the main canister 11 is communicated with the intake manifold 32.

The hydrocarbon sensor 13 is disposed in the main canister 11, and the hydrocarbon sensor 13 is electrically connected with the vehicle control unit 20. The hydrocarbon sensor 13 is capable of detecting the concentration of hydrocarbon in the main canister 11, and transmits the detection result to the vehicle control unit 20.

The spare canister 12 has a hollow can body, and the spare canister 12 is filled with activated carbon. The spare canister 12 has a spare canister gas inlet 122. The spare canister gas inlet 122 is hermetically connected with the second gas outlet 164 of the fuel vapor pipe 16. The one-way valve 18 is disposed between the spare canister 12 and the main canister 11. The one-way valve 18 could be opened towards the main canister 11 so that the main canister 11 communicates with the spare canister 12. A portion of the spare canister 12 which is away from the spare canister gas inlet 122 and the one-way valve 18 has a spare canister vent 126.

The solenoid valve controller 17 includes a solenoid valve 172, a cap status sensor 174, and a solenoid valve switch 176.

The solenoid valve 172 is disposed between the spare canister gas inlet 122 of the spare canister 12 and the second gas outlet 164 of the fuel vapor pipe 16. When the solenoid valve 172 is opened, the spare canister 12 communicates with the fuel vapor pipe 16. When the solenoid valve 172 is closed, the communication between the spare canister 12 and the fuel vapor pipe 16 is disconnected.

The solenoid valve switch 176 is disposed at the refueling port 43 of the vehicle body. The solenoid valve switch 176 is electrically connected with the solenoid valve 172. The solenoid valve switch 176 is switched on and switched off to control the opening and the closing of the solenoid valve 172. The solenoid valve switch 176 is electrically connected with the vehicle control unit 20, and the vehicle control unit 20 is capable of controlling the switch on and the switch off of the solenoid valve switch 176 so as to control the opening and closing of the solenoid valve 172. The cap status sensor 174 is disposed at the refueling port 43 of the vehicle body, and the cap status sensor 174 is electrically connected to the vehicle control unit 20 so that the cap status sensor 174 could send signals to the vehicle control unit 20.

The vehicle control unit 20 is a central controller of a hybrid electric vehicle. In this embodiment, the onboard refueling vapor recovery system 10 utilizes the vehicle control unit 20 to control and receive signals, that is, the vehicle control unit 20 controls the engine control unit (ECU) 22, the solenoid valve switch 176, and the like respectively. The vehicle control unit 20 simultaneously receives signals from the cap state sensor 174 and the hydrocarbon sensor 13, and the engine control unit 22 controls the operation of the engine 30, that is, the vehicle control unit 20 indirectly controls the engine 30.

Referring to FIG. 1 and FIG. 2, an operation principle of the onboard refueling vapor recovery system 10 of the embodiment of the present invention is described as follows.

The refueling process: during refueling, a liquid sealing is formed between the refueling gun (not shown) and the refueling pipe 42 of the fuel tank 40 to prevent the leakage of the oil vapor from the refueling pipe 42, and the oil vapor in the fuel tank 40 enters into the fuel vapor pipe 16 through the fill limit vent valve 15, and then into the main canister 11 to be adsorbed, after being adsorbed, the remain gas is discharged from the main canister 11 through the main canister vent 116 and the refueling process is completed.

The desorption process of a hybrid electric vehicle in electric mode: when the hybrid electric vehicle is in electric mode, the engine 30 does not work while the motor (not shown) operates, the oil vapor in the fuel tank enters into the fuel vapor pipe 16 through the grade rollover valve 14, then enters into the main canister 11 to be adsorbed. When the hydrocarbon sensor 13 detects that the concentration of the hydrocarbon in the main canister 11 reaches a certain level (for example, the concentration of the hydrocarbon is of 0.4 g/L), and transmits the detection result to the vehicle control unit 20, the vehicle control unit 20 controls the engine 30 to start operate through controlling the engine control unit 22, so as to desorb the main canister 11 (the oil vapor in the main canister 11 is drawn into the intake manifold 32), after desorption, the hydrocarbon sensor 13 detects that the concentration of the hydrocarbon in the main canister 11 reaches a normal value (for example, the concentration of the hydrocarbon is of 0.15 g/L) and transmits the detection result to the vehicle control unit 20, the controller 20 controls the engine 30 to stop working.

The desorption process of the hybrid electric vehicle in fuel mode: the oil vapor in the fuel tank 40 enters into the fuel vapor pipe 16 through the grade rollover valve 14 and enters into the main canister 11 to be adsorbed. Since the engine 30 is in working state at this moment, the engine 30 spontaneously desorbs the main canister 11. This process is basically the same as the desorption process of an ordinary vehicle, except that there is no vehicle control unit 20 in the ordinary vehicle, and the receiving and the controlling process are both executed by the engine control unit 22.

Refueling process with fault: in case the main canister 11 is aging and poor desorption due to long-term use, when the hydrocarbon sensor 13 detects the hydrocarbon concentration in the main canister 11 exceeds a specified value and the hydrocarbon concentration could not be restored to the normal level by the desorption process, meanwhile, the vehicle control unit 20 controls the maintenance warning light of the instrument panel 20 flickers and accompanied by a beep sound, and the vehicle control unit 20 controls the cap state sensor 174 to start working. If faulty refueling process is required at this moment, when the user opens the refueling cap 44 and inserts the refueling gun, the cap state sensor 174 sends a signal for opening the solenoid valve 172 to the vehicle control unit 20. After receiving the signal, the vehicle control unit 20 controls the solenoid valve switch 176 to switch on and control the solenoid valve 172 to open. When refueling, the oil vapor enters into the fuel vapor pipe 16 through the fill limit vent valve 15, and enters into the spare canister 12 through the solenoid valve 172 for being adsorbed, after adsorption, the gas is discharged from the spare canister 12 through the spare canister vent 126 to ensure normal refueling. It is also understood that the solenoid control switch 176 may be manually switched on and switched off.

Desorption process of the spare canister: since the one-way valve 18 is provided between the spare canister 12 and the main canister 11, when the engine 30 is working, the negative pressure generated by the engine 30 is sufficient to open the one-way valve 18, and communicates the spare canister 12 with the main canister 11, and the spare canister 12 is desorbed according to the above steps.

Furthermore, the present invention also provides an automobile, which includes the above onboard refueling vapor recovery system 10, and which may be an ordinary automobile or a hybrid electric vehicle.

As described above, the technical solutions in the embodiments of the present invention have the following advantages: the onboard refueling vapor recovery system 10 could normally refuel, adsorb and desorb the oil vapor even if the main canister 11 is aged and its desorption capability is failed.

In the present invention, the terms "include", "have" or any other variations thereof are intended to cover a non-exclusive inclusion, in addition to those listed, as well as other elements that are not expressly listed.

In the present invention, the terms such as front, rear, upper and lower, and the like are defined by the positions of the components in the drawings and their positions relative to each other, merely for the purpose of expressing the technical solutions clearly and conveniently. It should be understood that the use of the locative terms should not limit the scope of the claims of the present application.

In the case of no conflict, the above embodiments and the features in the embodiments of the present invention may be combined with each other.

The above illustrated embodiments are only preferred embodiments of the present invention and not intended to limit the present invention. Any modification, equivalent replacement, improvement, etc. within the spirit and principle of the present invention should be included in the protection scope of the present invention.

INDUSTRIAL APPLICABILITY

In the embodiments of the present invention, the onboard refueling vapor recovery system could normally refuel, adsorb and desorb the oil vapor even if the main canister is aged and its desorption capability is failed.

What is claimed is:

1. An onboard refueling vapor recovery system, wherein the onboard refueling vapor recovery system comprises a main canister and a spare canister which are filled with activated carbon, a hydrocarbon sensor, a grade rollover valve, a fill limit vent valve, and a fuel vapor pipe, the grade rollover valve and the fill limit vent valve are disposed at a top portion of a fuel tank, with opposite sides of the grade rollover valve and the fill limit vent valve respectively and hermetically connected with the fuel tank and a gas inlet end of the fuel vapor pipe, the main canister and the spare canister are respectively and hermetically connected with a gas outlet end of the fuel vapor pipe, the main canister is communicated with an intake manifold of an engine, the hydrocarbon sensor is disposed in the main canister, the hydrocarbon sensor is electrically connected with a vehicle control unit, the hydrocarbon sensor detects the concentration of hydrocarbon in the main canister and transmits the detection result to the vehicle control unit;

wherein the fuel vapor pipe comprises a first gas inlet, a second gas inlet, a first gas outlet, and a second gas outlet, the first gas inlet is hermetically connected with one side of the grade rollover valve, and the second gas inlet is hermetically connected with one side of the fill limit vent valve, the first gas outlet is communicated with the main canister, and the second gas outlet is communicated with the spare canister.

2. The onboard refueling vapor recovery system of claim 1, the main canister has a main canister gas inlet, and the main canister gas inlet is hermetically connected with the first gas outlet, a portion of the main canister which is away from the main canister gas inlet has a desorption gas inlet, the desorption gas inlet is connected with the intake manifold so that the main canister is communicated with the intake manifold.

3. The onboard refueling vapor recovery system of claim 2, wherein the spare canister has a spare canister gas inlet, the spare canister gas inlet is hermetically connected with the second gas outlet.

4. The onboard refueling vapor recovery system of claim 3, wherein the main canister has a main canister vent, and the spare canister has a spare canister vent, the main canister vent is disposed on the main canister at a portion away from the main canister gas inlet, the pare canister vent is disposed on the spare canister at a portion away from the spare canister gas inlet.

5. The onboard refueling vapor recovery system of claim 1, wherein the onboard refueling vapor recovery system further comprises a solenoid valve controller, the solenoid valve controller comprises a solenoid valve, the solenoid valve is disposed between the spare canister and the second gas outlet, the spare canister communicates with the fuel vapor pipe when the solenoid valve is opened, the communication between the spare canister and the fuel vapor pipe is disconnected when the solenoid valve is closed.

6. The onboard refueling vapor recovery system of claim 5, wherein the solenoid valve controller further comprises a solenoid valve switch, the solenoid valve switch is electrically connected with the solenoid valve, the solenoid valve switch is switched on and switched off to control the opening and closing of the solenoid valve, the solenoid valve switch is electrically connected with the vehicle control unit, the vehicle control unit controls the switch on and the switch off of the solenoid valve switch to control the opening and closing of the solenoid valve.

7. The onboard refueling vapor recovery system of claim 6, wherein the solenoid valve controller further comprises a cap status sensor, the cap status sensor is disposed at a refueling port of a vehicle body, the cap status sensor is electrically connected to the vehicle control unit and the vehicle control unit receives signals sending from the cap status sensor to control the switch on and the switch off of the solenoid valve switch so as to control the opening and closing of the solenoid valve.

8. The onboard refueling vapor recovery system of claim 1, wherein the onboard refueling vapor recovery system further comprises a one-way valve, the one-way valve is disposed between the main canister and the spare canister and a communication between the main canister and the spare canister is controlled by opening and closing the one-way valve.

9. The onboard refueling vapor recovery system of claim 6, wherein the solenoid valve is opened when the hydrocarbon sensor detects the hydrocarbon concentration in the main canister exceeds a specified value and the hydrocarbon concentration could not be restored to a normal level by a desorption process, and a refueling cap of the fuel tank is opened for refueling.

10. An automobile, comprising the onboard refueling vapor recovery system of claim 1.

11. The automobile of claim 10, the main canister has a main canister gas inlet, and the main canister gas inlet is hermetically connected with the first gas outlet, a portion of the main canister which is away from the main canister gas inlet has a desorption gas inlet, the desorption gas inlet is connected with the intake manifold so that the main canister is communicated with the intake manifold.

12. The automobile of claim 11, wherein the spare canister has a spare canister gas inlet, the spare canister gas inlet is hermetically connected with the second gas outlet.

13. The automobile of claim 12, wherein the main canister has a main canister vent, and the spare canister has a spare canister vent, the main canister vent is disposed on the main canister at a portion away from the main canister gas inlet, the pare canister vent is disposed on the spare canister at a portion away from the spare canister gas inlet.

14. The automobile of claim 10, wherein the onboard refueling vapor recovery system further comprises a solenoid valve controller, the solenoid valve controller comprises a solenoid valve, the solenoid valve is disposed between the spare canister and the second gas outlet, the spare canister communicates with the fuel vapor pipe when the solenoid valve is opened, the communication between the spare canister and the fuel vapor pipe is disconnected when the solenoid valve is closed.

15. The automobile of claim 14, wherein the solenoid valve controller further comprises a solenoid valve switch, the solenoid valve switch is electrically connected with the solenoid valve, the solenoid valve switch is switched on and switched off to control the opening and closing of the solenoid valve, the solenoid valve switch is electrically connected with the vehicle control unit, the vehicle control unit controls the switch on and the switch off of the solenoid valve switch to control the opening and closing of the solenoid valve.

16. The automobile of claim 15, wherein the solenoid valve controller further comprises a cap status sensor, the cap status sensor is disposed at a refueling port of a vehicle body, the cap status sensor is electrically connected to the vehicle control unit and the vehicle control unit receives signals sending from the cap status sensor to control the switch on and the switch off of the solenoid valve switch so as to control the opening and closing of the solenoid valve.

17. The automobile of claim 16, wherein the solenoid valve is opened when the hydrocarbon sensor detects the hydrocarbon concentration in the main canister exceeds a specified value and the hydrocarbon concentration could not be restored to a normal level by a desorption process, and a refueling cap of the fuel tank is opened for refueling.

18. The automobile of claim 10, wherein the onboard refueling vapor recovery system further comprises a one-way valve, the one-way valve is disposed between the main canister and the spare canister and a communication between the main canister and the spare canister is controlled by opening and closing the one-way valve.

\* \* \* \* \*